United States Patent
Sebire et al.

(10) Patent No.: US 8,682,328 B2
(45) Date of Patent: Mar. 25, 2014

(54) SYSTEMS, METHODS, AND APPARATUSES FOR FACILITATING HANDOVER TO CLOSED SUBSCRIBER GROUP CELLS

(75) Inventors: Guillaume Sebire, Espoo (FI); Simon Davis, Hampshire (GB)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/378,276

(22) PCT Filed: Apr. 6, 2010

(86) PCT No.: PCT/FI2010/050262
§ 371 (c)(1),
(2), (4) Date: Dec. 14, 2011

(87) PCT Pub. No.: WO2010/149829
PCT Pub. Date: Dec. 29, 2010

(65) Prior Publication Data
US 2012/0094673 A1    Apr. 19, 2012

Related U.S. Application Data

(60) Provisional application No. 61/220,752, filed on Jun. 26, 2009.

(51) Int. Cl.
*H04W 36/00* (2009.01)

(52) U.S. Cl.
USPC ........ 455/436; 455/453; 455/452.1; 455/433; 455/552.1

(58) Field of Classification Search
USPC .................... 455/436, 453, 452.1, 443, 552.1
See application file for complete search history.

(56) References Cited

U.S. PATENT DOCUMENTS

| | | | |
|---|---|---|---|
| 2007/0147377 A1* | 6/2007 | Laroia et al. | 370/392 |
| 2009/0239533 A1* | 9/2009 | Somasundaram et al. | 455/434 |
| 2010/0203865 A1* | 8/2010 | Horn et al. | 455/411 |
| 2012/0015652 A1* | 1/2012 | Jung et al. | 455/434 |
| 2012/0088505 A1* | 4/2012 | Toh et al. | 455/434 |

FOREIGN PATENT DOCUMENTS

| | | |
|---|---|---|
| WO | WO-2007053851 A2 | 5/2007 |
| WO | WO-2008096254 A2 | 8/2008 |
| WO | WO-2009117658 A1 | 9/2009 |
| WO | WO-2009134659 A2 | 11/2009 |

OTHER PUBLICATIONS

Nokia Corporation, et al., "3GPP Draft, R2-073920 CSG Cell Identification for Mobility and Measurement Reporting", Oct. 8-12, 2007.

(Continued)

*Primary Examiner* — Khai M Nguyen
(74) *Attorney, Agent, or Firm* — Mintz, Levin, Cohn, Ferris, Glovsky & Popeo, P.C.

(57) ABSTRACT

Methods, apparatuses, and systems are provided for facilitating handover to closed subscriber group cells. A method may include reading, when operating in idle mode, one or more information blocks broadcast by a closed subscriber group cell. The method may further include extracting one or more routing parameters and/or closed subscriber group identifier for the closed subscriber group cell from the one or more read information blocks. The method may additionally include storing a mapping of the one or more routing parameters and/or closed subscriber group identifier to a physical layer identifier and to a carrier frequency for the closed subscriber group cell. Corresponding apparatuses and systems are also provided.

40 Claims, 8 Drawing Sheets

(56) References Cited

OTHER PUBLICATIONS

3GPP TSG GERAN #41, "Supporting Inbound Mobility from GERAN to CSG in Dedicated / Packet Transfer Mode", Huawei Technologies Co. Ltd., Feb. 16-20, 2009.

3GPP TSG-RAN WG2#66, "[65b-3]: Inbound CSG mobility—Email Discussion Summary", May 4-8, 2009.

PCT International Search Report dated Jul. 6, 2010 for PCT application No. PCT/FI2010/050262.

* cited by examiner

SYSTEMS, METHODS, AND APPARATUSES FOR FACILITATING HANDOVER TO CLOSED SUBSCRIBER GROUP CELLS

RELATED APPLICATION

This application was originally filed as Patent Cooperation Treaty Application No. PCT/FI2010/050262 filed Apr. 6, 2010, which claims priority to U.S. Application No. 61/220, 752 filed Jun. 26, 2009.

TECHNOLOGICAL FIELD

Embodiments of the present invention relate generally to communication technology and, more particularly, relate to systems, methods, and apparatuses for facilitating handover to closed subscriber group cells.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer and providing convenience to users.

Current and future networking technologies continue to facilitate ease of information transfer and convenience to users. In order to provide easier or faster information transfer and convenience, telecommunication industry service providers are developing improvements to existing networks. In this regard, for example, improvements are being made to the universal mobile telecommunications system (UMTS) terrestrial radio access network (UTRAN). Further, for example, the evolved-UTRAN (E-UTRAN) is currently being developed. The E-UTRAN, which is also known as Long Term Evolution (LTE), is aimed at upgrading prior technologies by improving efficiency, lowering costs, improving services, making use of new spectrum opportunities, and providing better integration with other open standards.

One development in networks is the provision for localized base stations that may be individually owned and deployed in homes and businesses. These localized base stations are referred to as femtocells. Access to a network through a femtocell may be provided by a network operator, such as a public land mobile network (PLMN) operator. A femtocell may comprise a NodeB referred to as Home NodeB (HNB) in UTRAN and/or as a Home evolved NodeB (HeNB) in E-UTRAN. An HNB and/or an HeNB (H(e)NB) may be configured to operate as a closed subscriber group (CSG) cell, wherein the CSG cell is accessible only by members of a CSG to which the CSG cell is configured to provide access. In this regard, only mobile devices having an identity included in the CSG may be allowed to camp on or otherwise utilize the CSG cell as an access point to the operator network.

Although each deployed CSG cell may have a unique CSG identifier (CSG ID), CSG cells may be deployed in an uncoordinated manner and thus there may not be any network wide planning of physical layer identifiers for deployed CSG cells. Accordingly, multiple CSG cells connected to the same operator network may share a physical layer identifier on the same carrier frequency. A mobile terminal seeking a handover to a CSG cell may need to determine information about the CSG cell in addition to the physical layer identifier for the CSG cell in order to complete the handover. Although a mobile terminal may read a physical layer identifier for a CSG cell when engaged in an active communication in an connected mode, a mobile terminal may not be able to read this additional information when engaged in an active communication in connected mode and thus may have to drop or interrupt the active communication in order to read the additional information necessary to complete handover.

BRIEF SUMMARY OF SOME EXAMPLES OF THE INVENTION

Systems, methods, apparatuses, and computer program products are therefore provided for facilitating handover to closed subscriber group cells. In this regard, systems, methods, apparatuses, and computer program products are provided that may provide several advantages to computing devices, computing device users, and network operators. An embodiment of the invention provides a terminal configured to read information blocks broadcast by a CSG cell when operating in idle mode and to store a mapping between one or more parameters extracted from the read information and a physical layer identifier and/or a carrier frequency for the CSG cell. The terminal according to this embodiment of the invention is configured to use the mapping to retrieve information necessary for completing handover of the terminal when the terminal is operating in connected mode. Accordingly, embodiments of the invention eliminate the need for a terminal to read the information blocks when in connected mode. Embodiments of the invention therefore reduce the amount of time required for handovers, as reading information blocks broadcast by a CSG cell may take up to approximately 4.5 seconds. Further, embodiments of the invention reduce the possibility of service interruption when preparing for a handover while engaged in an active communication, since there is no need for the terminal to read information blocks broadcast by a CSG cell for which a mapping has been stored. Power consumption by a terminal is also reduced by some embodiments of the invention, as information blocks broadcast by CSG cells are read less frequently. Embodiments of the invention further provide a base station subsystem configured to receive a measurement report message comprising information about a CSG cell in addition to a physical layer identifier for the CSG cell so as to facilitate handover of a terminal to the CSG cell.

In a first example embodiment, a method is provided, which comprises reading, when in idle mode, one or more information blocks broadcast by a closed subscriber group cell. The method of this embodiment further comprises extracting one or more routing parameters and/or CSG ID for the closed subscriber group cell from the one or more read information blocks. The method of this embodiment additionally comprises storing a mapping of the one or more routing parameters and/or CSG ID to a physical layer identifier and to a carrier frequency for the closed subscriber group cell.

In another example embodiment, an apparatus is provided. The apparatus of this embodiment comprises at least one processor and at least one memory storing computer program code, wherein the at least one memory and stored computer program code are configured to, with the at least one processor, cause the apparatus to at least read, when the apparatus is operating in idle mode, one or more information blocks broadcast by a closed subscriber group cell. The at least one memory and stored computer program code are configured to, with the at least one processor, further cause the apparatus of this embodiment to extract one or more routing parameters and/or CSG ID for the closed subscriber group cell from the one or more read information blocks. The at least one memory and stored computer program code are configured to, with the at least one processor, additionally cause the apparatus of this embodiment to store a mapping of the one or more routing parameters and/or CSG ID to a physical layer identifier and to a carrier frequency for the closed subscriber group cell.

In another example embodiment, a computer program product is provided. The computer program product includes at least one computer-readable storage medium having computer-readable program instructions stored therein. The computer-readable program instructions may include a plurality of program instructions. Although in this summary, the program instructions are ordered, it will be appreciated that this summary is provided merely for purposes of example and the ordering is merely to facilitate summarizing the computer program product. The example ordering in no way limits the implementation of the associated computer program instructions. The first program instruction of this embodiment is configured for reading, when in idle mode, one or more information blocks broadcast by a closed subscriber group cell. The second program instruction of this embodiment is configured for extracting one or more routing parameters and/or CSG ID for the closed subscriber group cell from the one or more read information blocks. The third program instruction of this embodiment is configured for storing a mapping of the one or more routing parameters and/or CSG ID to a physical layer identifier and to a carrier frequency for the closed subscriber group cell.

In another example embodiment, an apparatus is provided that comprises means for reading, when the apparatus is operating in idle mode, one or more information blocks broadcast by a closed subscriber group cell. The apparatus of this embodiment further comprises means for extracting one or more routing parameters and/or CSG ID for the closed subscriber group cell from the one or more read information blocks. The apparatus of this embodiment additionally comprises means for storing a mapping of the one or more routing parameters and/or CSG ID to a physical layer identifier and to a carrier frequency for the closed subscriber group cell.

In another example embodiment, a method is provided, which comprises accessing a measurement report received from a terminal operating in connected mode, the measurement report comprising one or more of a closed subscriber group identity for a closed subscriber group cell and/or one or more routing parameters for the closed subscriber group cell, wherein the terminal read the one or more of the closed subscriber group identity and/or one or more routing parameters when the terminal was operating in idle mode. The method of this embodiment further comprises initiating a handover procedure to handover the terminal to the closed subscriber group cell based at least in part upon the one or more of the closed subscriber group identity and/or one or more routing parameters.

In another example embodiment, an apparatus is provided. The apparatus of this embodiment comprises at least one processor and at least one memory storing computer program code, wherein the at least one memory and stored computer program code are configured to, with the at least one processor, cause the apparatus to at least access a measurement report received from a terminal operating in connected mode, the measurement report comprising one or more of a closed subscriber group identity for a closed subscriber group cell and/or one or more routing parameters for the closed subscriber group cell, wherein the terminal read the one or more of the closed subscriber group identity and/or one or more routing parameters when the terminal was operating in idle mode. The at least one memory and stored computer program code are configured to, with the at least one processor, further cause the apparatus of this embodiment to initiate a handover procedure to handover the terminal to the closed subscriber group cell based at least in part upon the one or more of the closed subscriber group identity and/or one or more routing parameters.

In another example embodiment, a computer program product is provided. The computer program product includes at least one computer-readable storage medium having computer-readable program instructions stored therein. The computer-readable program instructions may include a plurality of program instructions. Although in this summary, the program instructions are ordered, it will be appreciated that this summary is provided merely for purposes of example and the ordering is merely to facilitate summarizing the computer program product. The example ordering in no way limits the implementation of the associated computer program instructions. The first program instruction of this embodiment is configured for accessing a measurement report received from a terminal operating in connected mode, the measurement report comprising one or more of a closed subscriber group identity for a closed subscriber group cell and/or one or more routing parameters for the closed subscriber group cell, wherein the terminal read the one or more of the closed subscriber group identity and/or one or more routing parameters when the terminal was operating in idle mode. The second program instruction of this embodiment is configured for initiating a handover procedure to handover the terminal to the closed subscriber group cell based at least in part upon the one or more of the closed subscriber group identity and/or one or more routing parameters.

In another example embodiment, an apparatus is provided that comprises means for accessing a measurement report received from a terminal operating in connected mode, the measurement report comprising one or more of a closed subscriber group identity for a closed subscriber group cell and/or one or more routing parameters for the closed subscriber group cell, wherein the terminal read the one or more of the closed subscriber group identity and/or one or more routing parameters when the terminal was operating in idle mode. The apparatus of this embodiment further comprises means for initiating a handover procedure to handover the terminal to the closed subscriber group cell based at least in part upon the one or more of the closed subscriber group identity and/or one or more routing parameters.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described embodiments of the invention in general terms, reference will now be made to the accompanying drawings, which are not necessarily drawn to scale, and wherein:

DETAILED DESCRIPTION

Figure 1:
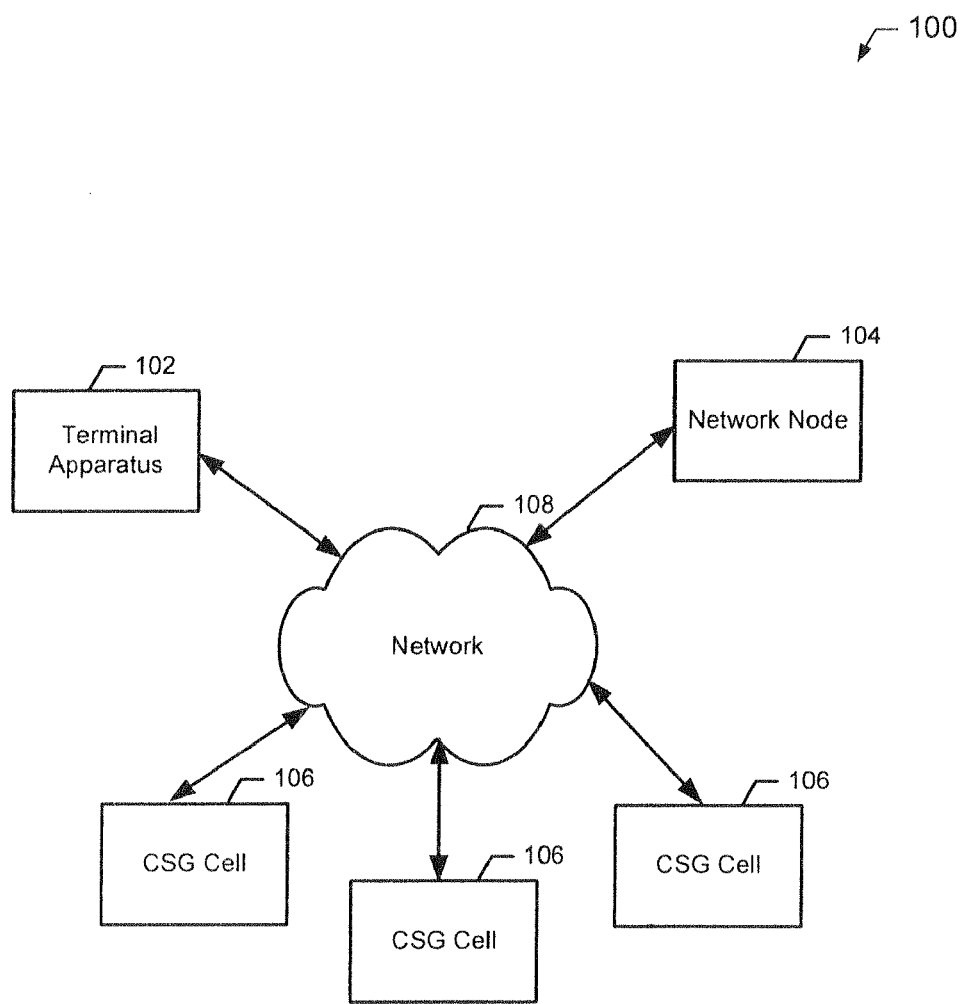
FIG. 1 illustrates a system for facilitating handover to closed subscriber group cells according to an exemplary embodiment of the present invention.

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

FIG. 1 illustrates a block diagram of a system 100 for facilitating handover to closed subscriber group cells according to an exemplary embodiment of the present invention. As used herein, "exemplary" merely means an example and as such represents one example embodiment for the invention and should not be construed to narrow the scope or spirit of the invention in any way. It will be appreciated that the scope of the invention encompasses many potential embodiments in addition to those illustrated and described herein. As such, while FIG. 1 illustrates one example of a configuration of a system for facilitating handover to closed subscriber group cells, numerous other configurations may also be used to implement embodiments of the present invention.

In at least some embodiments, the system 100 includes a terminal apparatus 102, network node 104, and one or more closed subscriber group (CSG) cells 106. In at least some embodiments, the system 100 further comprises a network 108. The network 108 may comprise one or more wireline networks, one or more wireless networks, or some combination thereof. In one embodiment, the network 108 comprises a public land mobile network (e.g., a cellular network), such as may be implemented by a network operator (e.g. a cellular access provider). The network 108 may operate in accordance with universal terrestrial radio access network (UTRAN) standards, evolved UTRAN (E-UTRAN) standards, GSM (Global System for Mobile communications) EDGE (Enhanced Data GSM Environment) radio access network (GERAN) standards and/or the like. It will be appreciated, however, that where references herein are made to a network standard and/or terminology particular to a network standard, the references are provided merely by way of example and not by way of limitation.

The CSG cell(s) 106 may comprise a femtocell, HNB, HeNB, and/or the like that is configured to operate as a closed subscriber group (CSG) cell. In this regard, a CSG cell 106 may be configured to provide a terminal apparatus 102 on an approved subscriber list with access to the network 108, such as by providing a radio connection to the terminal apparatus 102.

The network node 104 may comprise any network node configured to facilitate handover of the terminal apparatus 102 to a CSG cell 106. In this regard, the network node 104 may comprise, for example, a base station subsystem (BSS). The BSS may comprise a base station controller (BSC) and one or more base stations (BS). Accordingly, in some embodiments, the network node 104 is configured to provide access to the network 108 to the terminal apparatus 102 and may have an established radio connection with the terminal apparatus 102 prior to a handover of the terminal apparatus 102 to a CSG cell 106.

The terminal apparatus 102 may be embodied as a desktop computer, laptop computer, mobile terminal, mobile computer, mobile phone, mobile communication device, game device, digital camera/camcorder, audio/video player, television device, radio receiver, digital video recorder, positioning device, any combination thereof, and/or the like. In an exemplary embodiment, the terminal apparatus 102 is embodied as a mobile terminal, such as that illustrated in FIG. 2.

Figure 2:
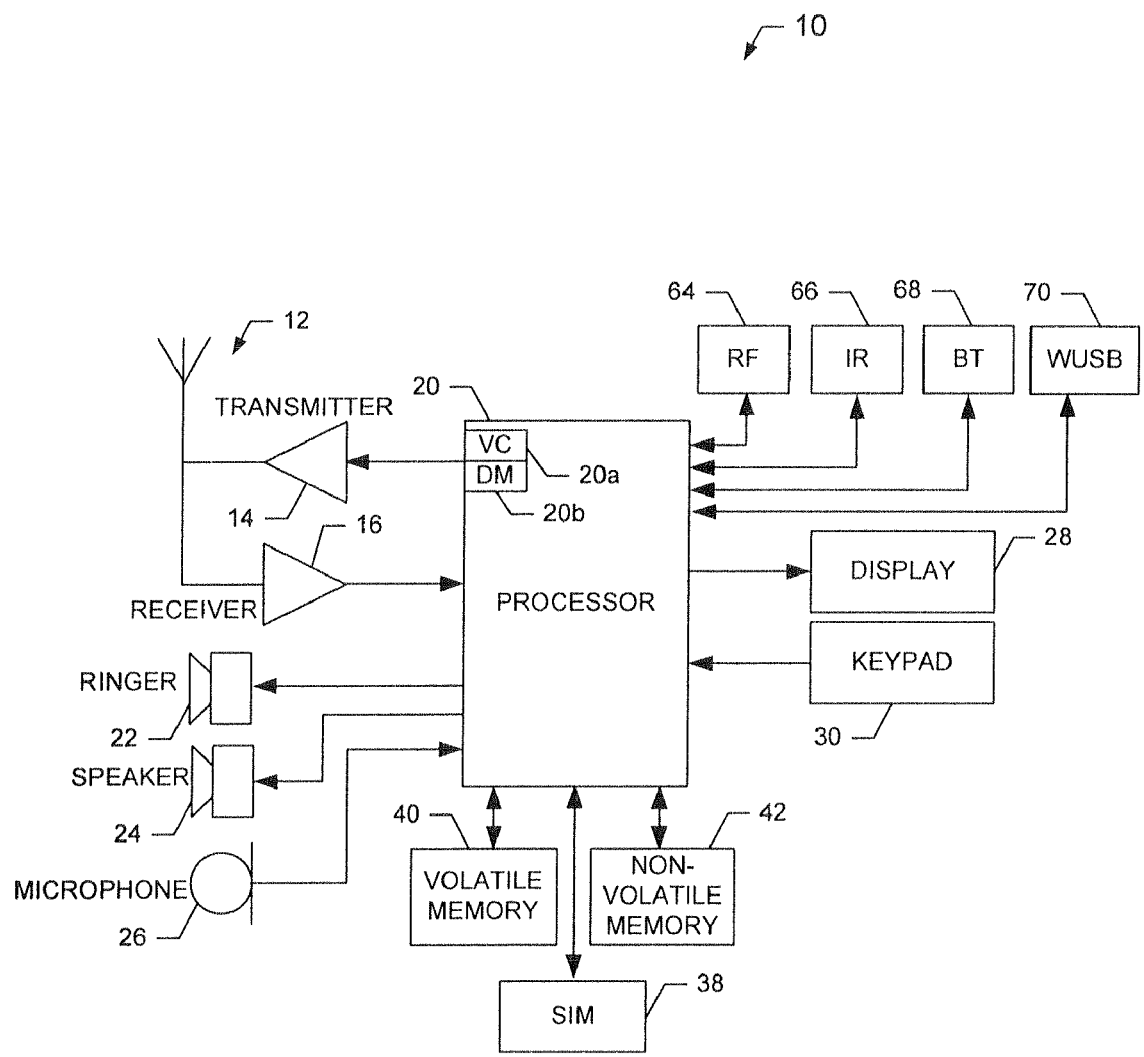
FIG. 2 is a schematic block diagram of a mobile terminal according to an exemplary embodiment of the present invention.

In this regard, FIG. 2 illustrates a block diagram of a mobile terminal 10 representative of one embodiment of a terminal apparatus 102 in accordance with embodiments of the present invention. It should be understood, however, that the mobile terminal 10 illustrated and hereinafter described is merely illustrative of one type of terminal apparatus 102 that may implement and/or benefit from embodiments of the present invention and, therefore, should not be taken to limit the scope of the present invention. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ embodiments of the present invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wireless-Fidelity (Wi-Fi), wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to Wireless Fidelity (Wi-Fi) or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (e.g., software and/or firmware) stored on a memory accessible to the processor 20 (e.g., volatile memory 40, non-volatile memory 42, and/or the like). Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to ultra-low power Bluetooth™ technology (e.g., Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wireless Fidelity (Wi-Fi), WLAN techniques such as IEEE 802.11 techniques, IEEE 802.15 techniques, IEEE 802.16 techniques, and/or the like.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Figure 3:
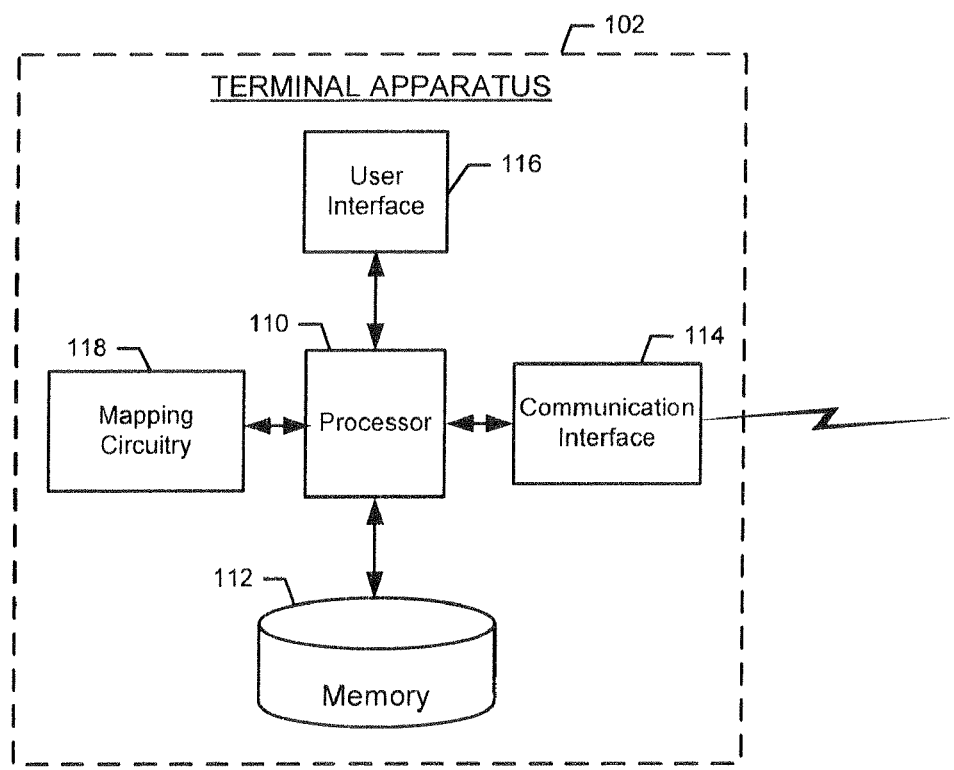
FIG. 3 illustrates a block diagram of a terminal for facilitating handover to closed subscriber group cells according to an exemplary embodiment of the present invention.

FIG. 3 illustrates a block diagram of a terminal apparatus 102 for facilitating handover to closed subscriber group cells according to an exemplary embodiment of the present invention. In the exemplary embodiment illustrated in FIG. 3, the terminal apparatus 102 includes various means, such as a processor 110, memory 112, communication interface 114, user interface 116, and mapping circuitry 118 for performing the various functions herein described. These means of the terminal apparatus 102 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g. memory 112) that is executable by a suitably configured processing device (e.g., the processor 110), or some combination thereof.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 3 as a single processor, in some embodiments the processor 110 comprises a plurality of processors. The plurality of processors may be in operative communication with each other and may be collectively configured to perform one or more functionalities of the terminal apparatus 102 as described herein. In embodiments wherein the terminal apparatus 102 is embodied as a mobile terminal 10, the processor 110 may be embodied as or comprise the processor 20. In an exemplary embodiment, the processor 110 is configured to execute instructions stored in the memory 112 or otherwise accessible to the processor 110. These instructions, when executed by the processor 110, may cause the terminal apparatus 102 to perform one or more of the functionalities of the terminal apparatus 102 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may include, for example, volatile and/or non-volatile memory. Although illustrated in FIG. 3 as a single memory, the memory 112 may comprise a plurality of memories. The memory 112 may comprise volatile memory, non-volatile memory, or some combination thereof. In this regard, the memory 112 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the terminal apparatus 102 is embodied as a mobile terminal 10, the memory 112 may comprise the volatile memory 40 and/or the non-volatile memory 42. The memory 112 may be configured to store information, data, applications, instructions, or the like for enabling the terminal apparatus 102 to carry out various functions in accordance with exemplary embodiments of the present invention. For example, in at least some embodiments, the memory 112 is configured to buffer input data for processing by the processor 110. Additionally or alternatively, in at least some embodiments, the memory 112 is configured to store program instructions for execution by the processor 110. The memory 112 may store information in the form of static and/or dynamic information. The memory may store a mapping table comprising mapping information mapping routing parameters and/or CSG Cell IDs to physical layer identifiers for CSG cells. This stored information may be stored and/or used by the mapping circuitry 118 during the course of performing its functionalities.

The communication interface 114 may be embodied as any device or means embodied in circuitry, hardware, a computer program product comprising computer readable program instructions stored on a computer readable medium (e.g., the memory 112) and executed by a processing device (e.g., the processor 110), or a combination thereof that is configured to receive and/or transmit data from/to an entity of the system 100, such as, for example, a network node 104 and/or a CSG cell 106. In at least one embodiment, the communication interface 114 is at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with one or more entities of the system 100. The communication interface 114 may be configured to receive and/or transmit data using any protocol that may be used for communications between entities of the system 100. The communication interface 114 may additionally be in communication with the memory 112, user interface 116, and/or mapping circuitry 118, such as via a bus.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touch screen display, a microphone, a speaker, and/or other input/ output mechanisms. The user interface 116 may be in communication with the memory 112, communication interface 114, and/or mapping circuitry 118, such as via a bus.

The mapping circuitry 118 may be embodied as various means, such as circuitry, hardware, a computer program product comprising computer readable program instructions stored on a computer readable medium (e.g., the memory 112) and executed by a processing device (e.g., the processor 110), or some combination thereof and, in one embodiment, is embodied as or otherwise controlled by the processor 110. In embodiments wherein the mapping circuitry 118 is embodied separately from the processor 110, the mapping circuitry 118 may be in communication with the processor 110. The mapping circuitry 118 may further be in communication with one or more of the memory 112, communication interface 114, or user interface 116, such as via a bus.

Figure 4:
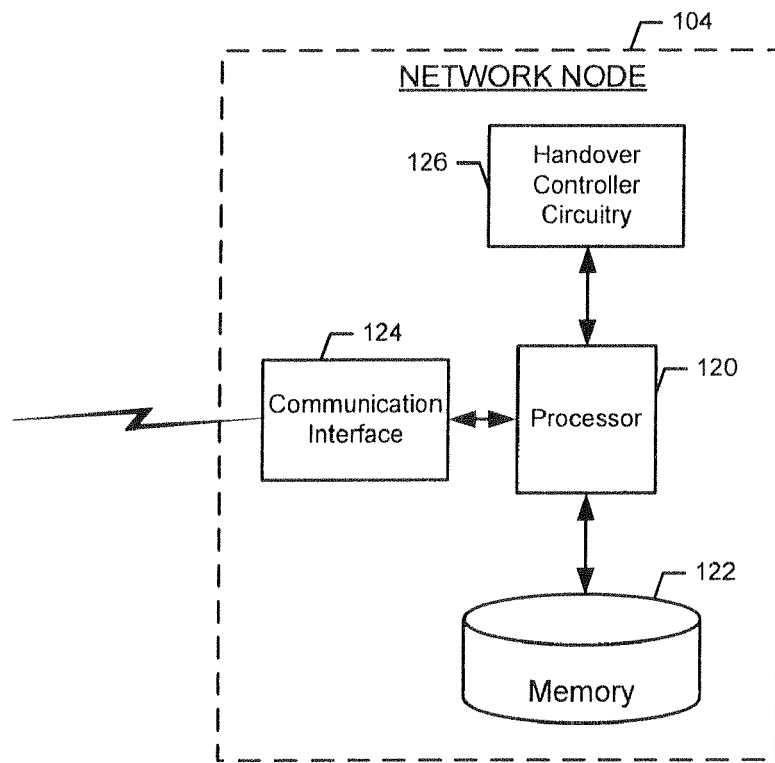
FIG. 4 illustrates a block diagram of a network node for facilitating handover to closed subscriber group cells according to an exemplary embodiment of the present invention.

FIG. 4 illustrates a block diagram of a network node 104 for facilitating handover to closed subscriber group cells according to an exemplary embodiment of the present invention. In an exemplary embodiment, the network node 104 includes various means, such as a processor 120, memory 122, communication interface 124, and handover controller circuitry 126 for performing the various functions herein described. These means of the network node 104 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g. memory 122) that is executable by a suitably configured processing device (e.g., the processor 120), or some combination thereof.

The processor 120 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 4 as a single processor, in some embodiments the processor 120 comprises a plurality of processors. The plurality of processors may be in operative communication with each other and may be collectively configured to perform one or more functionalities of the network node 104 as described herein. The plurality of processors may be embodied on a single computing device or distributed across a plurality of computing devices collectively configured to perform one or more functionalities of the network node 104 as described herein. In an exemplary embodiment, the processor 120 is configured to execute instructions stored in the memory 122 or otherwise accessible to the processor 120. These instructions, when executed by the processor 120, may cause the network node 104 to perform one or more of the functionalities of the network node 104 as described herein. As such, whether configured by hardware or software methods, or by a combination thereof, the processor 120 may comprise an entity capable of performing operations according to embodiments of the present invention while configured accordingly. Thus, for example, when the processor 120 is embodied as an ASIC, FPGA or the like, the processor 120 may comprise specifically configured hardware for conducting one or more operations described herein. Alternatively, as another example, when the processor 120 is embodied as an executor of instructions, such as may be stored in the memory 122, the instructions may specifically configure the processor 120 to perform one or more algorithms and operations described herein.

The memory 122 may include, for example, volatile and/or non-volatile memory. Although illustrated in FIG. 4 as a single memory, the memory 122 may comprise a plurality of memories. The plurality of memories may be embodied on a single computing device or distributed across a plurality of computing devices. The memory 122 may comprise volatile memory, non-volatile memory, or some combination thereof. In this regard, the memory 122 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. The memory 122 may be configured to store information, data, applications, instructions, or the like for enabling the network node 104 to carry out various functions in accordance with exemplary embodiments of the present invention. For example, in at least some embodiments, the memory 122 is configured to buffer input data for processing by the processor 120. Additionally or alternatively, in at least some embodiments, the memory 122 is configured to store program instructions for execution by the processor 120. The memory 122 may store information in the form of static and/or dynamic information. This stored information may be stored and/or used by the handover controller circuitry 126 during the course of performing its functionalities.

The communication interface 124 may be embodied as any device or means embodied in circuitry, hardware, a computer program product comprising computer readable program instructions stored on a computer readable medium (e.g., the memory 122) and executed by a processing device (e.g., the processor 120), or a combination thereof that is configured to receive and/or transmit data from/to an entity of the system 100, such as, for example, a terminal apparatus 102. In at least one embodiment, the communication interface 124 is at least partially embodied as or otherwise controlled by the processor 120. In this regard, the communication interface 124 may be in communication with the processor 120, such as via a bus. The communication interface 124 may include, for example, an antenna, a transmitter, a receiver, a transceiver and/or supporting hardware or software for enabling communications with one or more entities of the system 100. The communication interface 124 may be configured to receive and/or transmit data using any protocol that may be used for communications between entities of the system 100. The communication interface 124 may additionally be in communication with the memory 122 and/or handover controller circuitry 126, such as via a bus.

The handover controller circuitry 126 may be embodied as various means, such as circuitry, hardware, a computer program product comprising computer readable program instructions stored on a computer readable medium (e.g., the memory 122) and executed by a processing device (e.g., the processor 120), or some combination thereof and, in one embodiment, is embodied as or otherwise controlled by the processor 120. In embodiments wherein the handover controller circuitry 126 is embodied separately from the processor 120, the handover controller circuitry 126 may be in communication with the processor 120. The handover controller circuitry 126 may further be in communication with one or more of the memory 122 or communication interface 124, such as via a bus.

The mapping circuitry 118 may be configured to cause the communication interface 114 to receive one or more information blocks broadcast by a CSG cell 106 within radio range of the terminal apparatus 102 (e.g., a potential target CSG cell 106) when the terminal apparatus 102 is operating in idle mode (e.g., packet idle mode). In this regard, the broadcast one or more information blocks may be read without interrupting an active communication when the terminal is operating in connected mode (e.g., packet transfer mode, dedicated mode, dual transfer mode, or the like). The information blocks may comprise, for example, master information block(s) (MIB), system information blocks(s) (SIB), and/or the like. The mapping circuitry 118 may be configured to read a MIB to determine scheduling information for one or more SIBs broadcast by the CSG cell 106. The mapping circuitry 118 is configured in an exemplary embodiment to read the one or more received information blocks to extract one or more parameters. For example, the mapping circuitry 118 may be configured to extract a CSG identity (CSG ID) from a SIB. The mapping circuitry 118 may be further configured to extract one or more routing parameters for the CSG cell 106 from the read information blocks (e.g., from one or more SIBs) broadcast by the CSG cell 106. These routing parameters may include, for example, a tracking area identifier (TAI), cell global identifier (CGI), radio network controller identifier (RNC ID), and/or the like.

The mapping circuitry 118 is further configured in some embodiments of the invention to store a mapping of one or more of the extracted parameters to a physical layer identity (PLI) for the CSG cell 106. This mapping may be stored, for example, as an entry in a mapping table stored in the memory 112 comprising mapping information mapping routing parameters and/or CSG Cell IDs to physical layer identifiers for one or more CSG cells 106. The PLI may comprise, for example, a physical cell identifier (PCI), primary scrambling code (PSC), or the like. The stored mapping information may be used by the mapping circuitry 118 when the terminal apparatus 102 is in connected mode to facilitate a handover to the closed subscriber group cell 106 with which the mapping information is associated. The mapping may further map one or more of the extracted parameters to a carrier frequency on which the CSG cell 106 operates. The mapping circuitry 118 may be configured to determine the PLI and/or carrier frequency for the CSG cell 106 by monitoring a synchronization channel broadcast by the CSG cell 106. The mapping circuitry 118 may be configured to determine the PLI and/or carrier frequency when the terminal apparatus 102 is operating in either idle or connected mode, as the PLI and carrier frequency may be read without impacting an active communication when the terminal apparatus 102 is operating in connected mode.

In some embodiments, the mapping circuitry 118 is additionally configured to determine whether the extracted CSG ID for the CSG cell 106 is on an allowed list, such as may be stored in the memory 112, of CSG cells that the terminal apparatus 102 is allowed to connect to. In such embodiments, the mapping circuitry 118 may be configured to store mapping information for the CSG cell 106 only when the CSG ID for the CSG cell 106 is on the allowed list.

The mapping circuitry 118 may be further configured to determine whether it has read information blocks and/or stored mapping information for two or more CSG cells 106 having the same PLI and operating on the same carrier frequency. If the mapping circuitry 118 determines such a condition exists, then the mapping circuitry 118 may be configured to determine a physical layer confusion exists and may store an indication with the mapping information stored for the CSG cell(s) 106 having the same PLI and operating on the same carrier frequency of they physical layer confusion.

The mapping circuitry 118 may be additionally configured to determine fingerprinting information related to a physical vicinity in which a CSG cell 106 was observed through reading one or more information blocks broadcast by the CSG cell 106 and/or macro cells from other radio technologies whose identities may be read from system information. This fingerprinting information may comprise, for example, one or more of one or more Global System for Mobile Communications (GSM) cells in which the CSG cell 106 was observed, one or more routing areas, one or more tracking areas, one or more global positioning system locations of the terminal apparatus 102 when the CSG cell 106 was observed, and/or the like. The mapping circuitry 118 may be configured to store this determined fingerprinting information with the mapping information for the CSG cell 106 and may later use the fingerprinting information to select a CSG cell to handover to based at least in part upon a present location of the terminal apparatus 102.

In some embodiments, the mapping circuitry 118 is configured to implement a freshness policy to ensure the freshness of stored mapping information. In this regard, the mapping circuitry 118 may be configured to delete a stored mapping upon an occurrence of a predefined freshness policy condition. For example, upon storing a mapping, the mapping circuitry 118 may be configured to set a timer to a predefined value. The timer may be associated only with a single mapping (e.g., only with the mapping that was just stored), with multiple mappings, or with every mapping entry stored in the mapping table. Upon expiration of the timer, the mapping circuitry 118 may delete the mapping(s) associated with the expired timer. In another example, the mapping circuitry 118 may be configured to delete one or more mappings when the terminal apparatus 102 changes to a new public land mobile network (e.g., a network operated by another mobile service provider).

When the terminal apparatus 102 is operating in connected mode, the mapping circuitry 118 may select a target CSG cell 106 to handover to. The mapping circuitry 118 may then format an initial measurement report and cause the initial measurement report to be transmitted to the network node 104 via the communication interface 114. The initial measurement report may comprise physical layer information for the target CSG cell 106. This physical layer information may comprise a PLI and carrier frequency (e.g., a carrier frequency index) for the CSG cell 106. In embodiments wherein the mapping circuitry 118 is configured to store an indication of a PLI confusion with mapping information for a CSG cell, the mapping circuitry 118 may be configured to determine whether there is a stored indication of a PLI confusion for the selected target CSG cell 106 and may include this indication in the initial measurement report.

The communication interface 124 of the network node 104 may be configured to receive the initial measurement report, which may then be accessed by the handover controller circuitry 126. The handover controller circuitry 126 may be configured to extract the physical layer information for the target CSG cell 106 from the initial measurement report and look up the physical layer information in a mapping table stored in the memory 122 to determine whether there is an entry in the mapping table mapping the physical layer information to one or more routing parameters and/or a CSG ID for the target CSG cell 106. If there is not an entry in the mapping table stored in the memory 122 mapping the physical layer information to one or more routing parameters and/or a CSG ID for the target CSG cell 106, the handover controller circuitry 126 may be configured to cause the communication interface 124 to send a request message to the terminal apparatus 102 requesting the terminal apparatus 102 to send a measurement report comprising one or more of the CSG ID for the target CSG cell 106 and/or one or more routing parameters for the target CSG cell 106. The handover controller circuitry 126 may be similarly configured to cause the communication interface 124 send a request message to the terminal apparatus 102 when the handover controller 126 determines that there are multiple stored mapping entries for the physical layer information (e.g., there is physical layer identifier confusion) and/or when the handover controller 126 determines that the terminal apparatus 102 has included an indication of a physical layer identifier confusion in the initial measurement report.

The mapping circuitry 118 may be configured, in response to the terminal apparatus 102 receiving a request message from the network node 102, to retrieve the mapping information for the target CSG cell 106. The mapping circuitry 118 may then format a second measurement report comprising one or more of the CSG ID for the target CSG cell 106 or one or more routing parameters for the target CSG cell 106. The mapping circuitry 118 may be further configured to cause the communication interface 114 to transmit the configured second measurement report to the network node 104 so as to facilitate handover of the terminal apparatus 102 to the target CSG cell 106.

Following receipt of the second measurement report by the network node 104, the handover controller circuitry 126 may be configured to use the one or more of the CSG ID for the target CSG cell 106 or one or more routing parameters for the target CSG cell 106 included in the second measurement report to initialize a handover procedure to handover the terminal apparatus 102 to the target CSG cell 106. The handover controller circuitry 126 may be further configured to store a mapping entry in the memory 122 mapping the one or more of the CSG ID for the target CSG cell 106 or one or more routing parameters for the target CSG cell 106 to the physical layer information (e.g., PLI and carrier frequency) for the target CSG cell 106 to be used for a later handover of a terminal apparatus.

Figure 5:
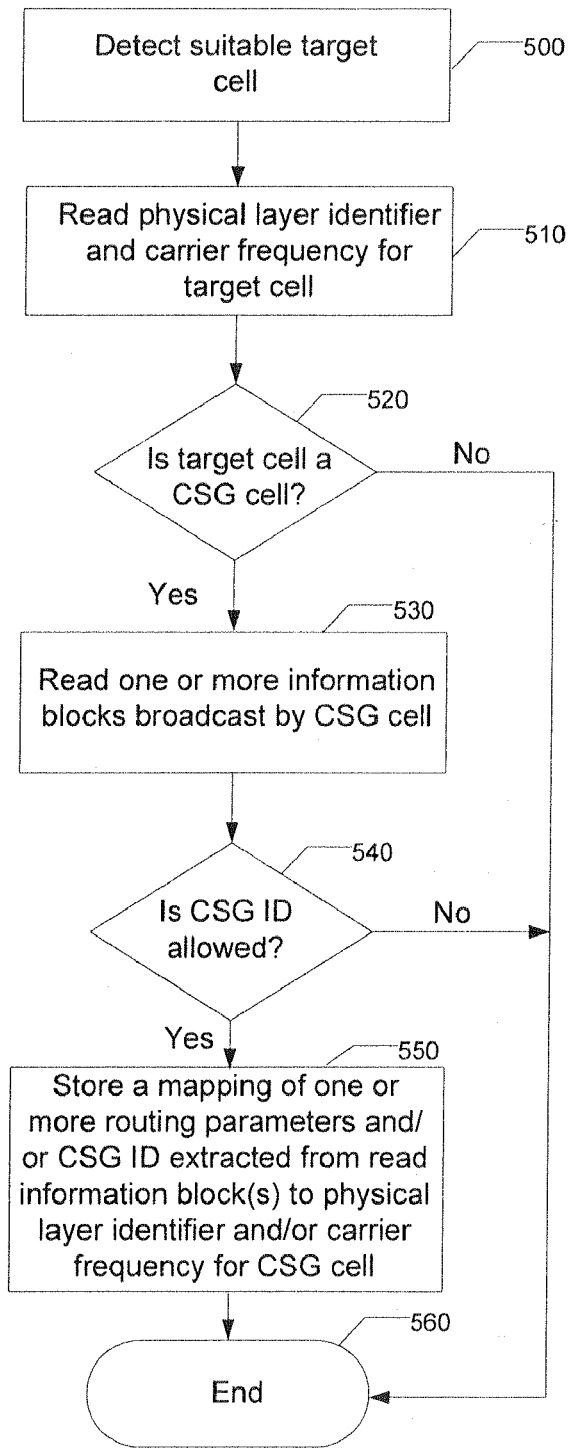
FIG. 5 illustrates a flowchart according to an exemplary method for facilitating handover to closed subscriber group cells according to an exemplary embodiment of the invention.

FIG. 5 illustrates a flowchart according to an exemplary method for facilitating handover to closed subscriber group cells according to an exemplary embodiment of the invention. In this regard, FIG. 5 illustrates operations that may be performed by the terminal apparatus 102 when engaging in an idle mode measurement process according to an exemplary embodiment of the invention. The method may include the mapping circuitry 118 detecting a suitable target cell, at operation 500. The suitable target cell may comprise any cell configured for accessing the network 108 that is within range of the terminal apparatus 102 and thus may not necessarily comprise a CSG cell 106. Operation 510 may comprise the mapping circuitry 118 reading the physical layer identifier and carrier frequency for the target cell. The mapping circuitry 118 may then determine whether the target cell is a CSG cell 106, at operation 520.

If the target cell is not a CSG cell 106, the method may end at operation 560. If the target cell is a CSG cell 106, the mapping circuitry 118 may read one or more information blocks broadcast by the CSG cell 106 to extract the CSG ID for the CSG cell 106, at operation 530. Operation 540 may comprise the mapping circuitry 118 determining whether the CSG ID is on an allowed list of CSG cells 106 that the terminal apparatus 102 is allowed to connect to. If the CSG ID is not on the allowed list, the method may conclude at operation 560. If, however, the CSG ID is on the allowed list, the mapping circuitry 118 may store a mapping entry mapping one or more routing parameters and/or CSG ID extracted from the read information block(s) to the physical layer identifier and/or the carrier frequency for the CSG cell 106, at operation 550. The method may then conclude at operation 560.

Figure 6:
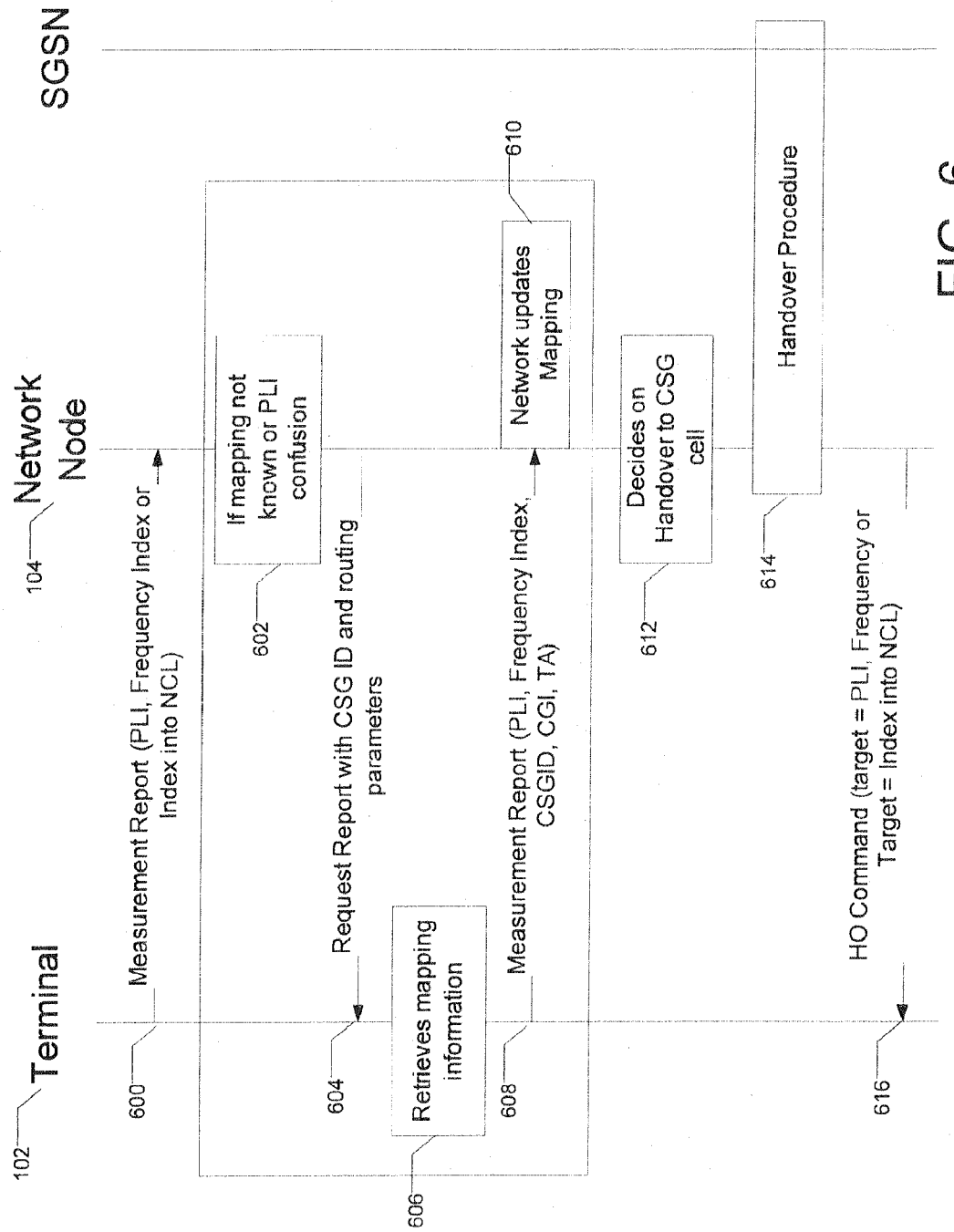
FIG. 6 illustrates a signaling diagram of signals that may be exchanged between entities of the system of FIG. 1 according to an exemplary method for facilitating handover to closed subscriber group cells according to an exemplary embodiment of the invention.

FIG. 6 illustrates a signaling diagram of signals that may be exchanged between entities of the system 100 according to an exemplary method for facilitating handover to closed subscriber group cells according to an exemplary embodiment of the invention. The terminal apparatus 102 may send an initial measurement report to the network node 104, at operation 600. The initial measurement report may comprise a PLI for a target CSG cell 106 and an indication of a carrier frequency for the CSG cell 106 (e.g., frequency index, index into Neighbour Cell List (NCL), or the like). The network node 104 may receive the initial measurement report and then determine either that a stored mapping is not available for the target CSG cell 106 and/or that there is PLI confusion, at operation 602. Operation 604 may comprise the network node 104 sending a request message to the terminal apparatus 102 requesting a measurement report including the CSG ID and routing parameters for the target CSG cell 106. The terminal apparatus 102 may then retrieve stored mapping information for the target cell 106 at operation 606 and use the retrieved mapping information to format a second measurement report comprising the CSG ID and routing parameters (e.g., CGI, TAI, RNC ID, and/or the like) for the target CSG cell 106. The terminal apparatus 102 may then send the second measurement report to the network node 104, at operation 608. Operation 610 may comprise the network node 104 updating a mapping tale stored in the memory 122 to include mapping information for the target CSG cell 106. The network node 104 (e.g., the handover controller circuitry 126) may then decide to handover the terminal 102 to the target CSG cell 106, at operation 612. Operation 614 may comprise the network node 104 (e.g., the handover controller circuitry 126) initiating a handover procedure with a Serving GPRS Support Node (SGSN) or other network entity. The network node 104 (e.g., the handover controller circuitry 126) may then send a handover command to the terminal apparatus 102, at operation 616.

Figure 7:
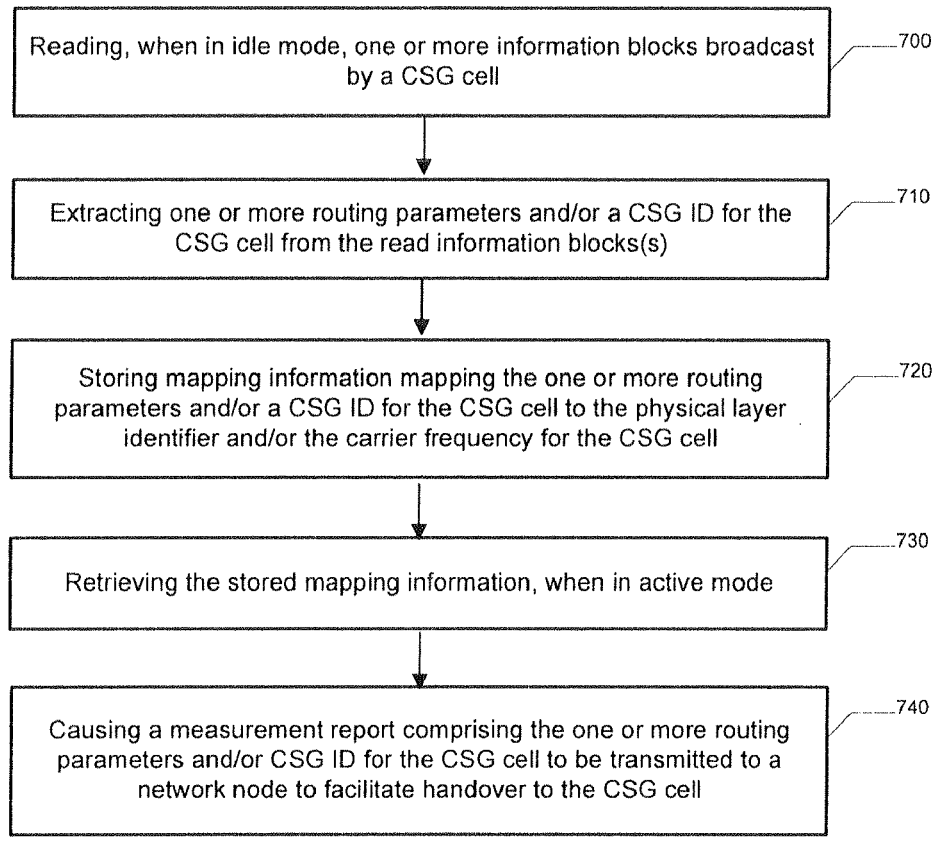
FIG. 7 illustrates a flowchart according to an exemplary method for facilitating handover to closed subscriber group cells according to an exemplary embodiment of the invention.

FIG. 7 illustrates a flowchart according to an exemplary method for facilitating handover to closed subscriber group cells according to an exemplary embodiment of the invention. In this regard, FIG. 7 illustrates operations that may be performed by the mapping circuitry 118. Operation 700 may comprise the mapping circuitry 118 reading, when operating in idle mode, one or more information blocks broadcast by a CSG cell 106. The mapping circuitry 118 may then extract one or more routing parameters and/or a CSG ID for the CSG cell 106 from the read information block(s), at operation 710. Operation 720 may comprise the mapping circuitry 118 storing mapping information mapping the one or more routing parameters and/or a CSG ID for the CSG cell 106 to the physical layer identifier and/or carrier frequency for the CSG cell 106. The mapping circuitry 118 may then retrieve the stored mapping information, at operation 730, when in operating in active mode after selecting the CSG cell 106 to handover to. Operation 740 may comprise the mapping circuitry 118 causing a measurement report comprising the one or more routing parameters and/or the CSG ID for the CSG cell 106 to be transmitted to a network node 104 to facilitate handover to the CSG cell 106.

Figure 8:
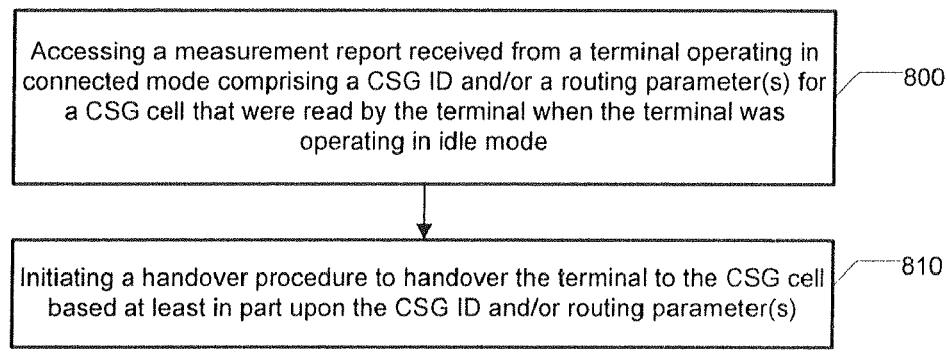
FIG. 8 illustrates a flowchart according to an exemplary method for facilitating handover to closed subscriber group cells according to an exemplary embodiment of the invention.

FIG. 8 illustrates a flowchart according to an exemplary method for facilitating handover to closed subscriber group cells according to an exemplary embodiment of the invention. In this regard, FIG. 8 illustrates operations that may be performed by the handover controller circuitry 126. The method may include the handover controller circuitry 126 accessing a measurement report received from a terminal apparatus 102 operating in connected mode comprising a CSG ID and/or a routing parameter(s) for a target CSG cell 106, at operation 800. The CSG ID and/or routing parameter(s) for the target CSG cell 106 may have been extracted from information blocks broadcast by the target CSG cell 106 that were read by the terminal apparatus 102 when the terminal apparatus 102 was operating in idle mode. Operation 810 may comprise the handover controller circuitry 126 initiating handover procedure to handover the terminal apparatus 102 to the target CSG cell 106 based at least in part upon the CSG ID and/or routing parameter(s).

FIGS. 5, 7, and 8 are flowcharts of a system, method, and computer program product according to exemplary embodiments of the invention. It will be understood that each block or step of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device and executed by a processor in the computing device. In some embodiments, the computer program instructions comprising the computer program product(s) which embody the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s) or step(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s) or step(s). The computer program instructions of one or more computer program products may also be loaded onto a computer or other programmable apparatus (e.g., a terminal apparatus 102 and/or network node 104) to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowchart support combinations of means for performing the specified functions and combinations of steps for performing the specified functions. It will also be understood that one or more blocks or steps of the flowchart, and combinations of blocks or steps in the flowchart, may be implemented by special purpose hardware-based computer systems which perform the specified functions or steps, or combinations of special purpose hardware and computer program product(s).

The above described functions may be carried out in many ways. For example, any suitable means for carrying out each of the functions described above may be employed to carry out embodiments of the invention. In one embodiment, a suitably configured processor may provide all or a portion of the elements of the invention. In another embodiment, all or a portion of the elements of the invention may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

Accordingly, embodiments of the invention eliminate the need for a terminal to read the information blocks when in connected mode. Embodiments of the invention therefore reduce the amount of time required for handovers, as reading information blocks broadcast by a CSG cell may take up to approximately 4.5 seconds. Further, embodiments of the invention reduce the possibility of service interruption when preparing for a handover while engaged in an active communication, since there is no need for the terminal to read information blocks broadcast by a CSG cell for which a mapping has been stored. Power consumption by a terminal is also reduced by some embodiments of the invention, as information blocks broadcast by CSG cells are read less frequently. Embodiments of the invention further provide a base station subsystem configured to receive a measurement report message comprising information about a CSG cell in addition to a physical layer identifier for the CSG cell so as to facilitate handover of a terminal to the CSG cell Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method, comprising:
reading, when in idle mode, one or more information blocks broadcast by a closed subscriber group cell;
extracting one or more routing parameters for the closed subscriber group cell from the one or more read information blocks; and
storing a mapping of the one or more routing parameters to a physical layer identifier and to a carrier frequency for the closed subscriber group cell.

2. A method according to claim 1, wherein the one or more information blocks comprise one or more of a master information block or a system information block.

3. A method according to claim 1, wherein the one or more routing parameters comprise one or more of a cell global identifier, a tracking area identifier, or a radio network controller identifier.

4. A method according to claim 1, wherein the physical layer identifier comprises a physical cell identifier or a primary scrambling code.

5. A method according to claim 1, further comprising using the stored mapping when in connected mode to format a measurement report for facilitating handover to the closed subscriber group cell.

6. A method according to claim 1, further comprising extracting a closed subscriber group identifier from the one or more read information blocks.

7. A method according to claim 6, wherein storing the mapping comprises storing a mapping of the closed subscriber group identifier to the physical layer identifier and to the carrier frequency for the closed subscriber group cell.

8. A method according to claim 6, further comprising determining whether the closed subscriber group identifier is on an allowed list.

9. A method according to claim 8, wherein storing the mapping comprises storing the mapping only when the closed subscriber group identifier is on the allowed list.

10. A method according to claim 1, wherein storing the mapping comprises storing fingerprinting information related to a physical vicinity in which the closed subscriber group cell was observed through reading of the one or more information blocks.

11. A method according to claim 10, wherein the fingerprinting information comprises one or more of a list of one or more GSM cells in which the closed subscriber group cell was identified, one or more routing areas, one or more tracking areas, or one or more global positioning system locations.

12. A method according to claim 1, wherein the method further comprises deleting the mapping upon an occurrence of a predefined freshness policy condition.

13. A method according to claim 12, further comprising setting a timer to a predefined value after storing the mapping.

14. A method according to claim 13, wherein deleting the mapping upon an occurrence of a predefined freshness policy condition comprises deleting the mapping upon expiration of the timer.

15. A method according to claim 12, wherein deleting the mapping upon an occurrence of a predefined freshness policy condition comprises deleting the mapping upon changing to a new public land mobile network.

16. A method according to claim 1, further comprising determining a physical layer identifier confusion when a second closed subscriber group cell has the same physical layer identifier and carrier frequency as the closed subscriber group cell whose broadcast one or more information blocks were read.

17. A method according to claim 16, wherein storing the mapping comprises storing an indication of the physical layer identifier confusion with the mapping.

18. A method according to claim 1, further comprising retrieving, when in connected mode, the mapping in response to a received request from a base station subsystem for a measurement report comprising one or more of the closed subscriber group identity and/or one or more routing parameters.

19. A method according to claim 18, further comprising using the retrieved mapping to format a measurement report for the closed subscriber group cell comprising one or more of the closed subscriber group identity and/or one or more routing parameters.

20. A method according to claim 19, further comprising causing the measurement report to be transmitted to the base station subsystem so as to facilitate handover to the closed subscriber group cell.

21. An apparatus comprising at least one processor and at least one memory storing computer program code, wherein the at least one memory and stored computer program code are configured to, with the at least one processor, cause the apparatus to at least:
read, when the apparatus is operating in idle mode, one or more information blocks broadcast by a closed subscriber group cell;
extract one or more routing parameters for the closed subscriber group cell from the one or more read information blocks; and
store a mapping of the one or more routing parameters to a physical layer identifier and to a carrier frequency for the closed subscriber group cell.

22. An apparatus according to claim 21, wherein the one or more information blocks comprise one or more of a master information block or a system information block.

23. An apparatus according to claim 21, wherein the one or more routing parameters comprise one or more of a cell global identifier, a tracking area identifier, or a radio network controller identifier.

24. An apparatus according to claim 21, wherein the physical layer identifier comprises a physical cell identifier or a primary scrambling code.

25. An apparatus according to claim 21, wherein the stored mapping is stored for use when in connected mode to format a measurement report for facilitating handover to the closed subscriber group cell.

26. An apparatus according to claim 21, wherein the at least one memory and stored computer program code are configured to, with the at least one processor, further cause the apparatus to extract a closed subscriber group identifier from the one or more read information blocks.

27. An apparatus according to claim 26, wherein the at least one memory and stored computer program code are configured to, with the at least one processor, cause the apparatus to store the mapping by further storing a mapping of the closed subscriber group identifier to the physical layer identifier and to the carrier frequency for the closed subscriber group cell.

28. An apparatus according to claim 26, wherein the at least one memory and stored computer program code are configured to, with the at least one processor, further cause the apparatus to determine whether the closed subscriber group identifier is on an allowed list.

29. An apparatus according to claim 21, wherein the at least one memory and stored computer program code are configured to, with the at least one processor, cause the apparatus to store the mapping by further storing fingerprinting information related to a physical vicinity in which the closed subscriber group cell was observed through reading of the one or more information blocks.

30. An apparatus according to claim 29, wherein the fingerprinting information comprises one or more of a list of one or more GSM cells in which the closed subscriber group cell was identified, one or more routing areas, one or more tracking areas, or one or more global positioning system locations.

31. An apparatus according to claim 21, wherein the at least one memory and stored computer program code are configured to, with the at least one processor, further cause the apparatus to delete the mapping upon an occurrence of a predefined freshness policy condition.

32. An apparatus according to claim 31, wherein the at least one memory and stored computer program code are configured to, with the at least one processor, further cause the apparatus to set a timer to a predefined value after storing the mapping.

33. An apparatus according to claim 32, wherein the at least one memory and stored computer program code are configured to, with the at least one processor, cause the apparatus to delete the mapping upon an occurrence of a predefined freshness policy condition by deleting the mapping upon expiration of the timer.

34. An apparatus according to claim 31, wherein the at least one memory and stored computer program code are configured to, with the at least one processor, cause the apparatus to delete the mapping upon an occurrence of a predefined freshness policy condition by deleting the mapping upon changing to a new public land mobile network.

35. An apparatus according to claim 21, wherein the at least one memory and stored computer program code are configured to, with the at least one processor, further cause the apparatus to determine a physical layer identifier confusion when a second closed subscriber group cell has the same physical layer identifier and carrier frequency as the closed subscriber group cell whose broadcast one or more information blocks were read.

36. An apparatus according to claim 35, wherein the at least one memory and stored computer program code are configured to, with the at least one processor, cause the apparatus to store the mapping by further storing an indication of the physical layer identifier confusion with the mapping.

37. An apparatus according to claim 21, wherein the at least one memory and stored computer program code are configured to, with the at least one processor, additionally cause the apparatus to retrieve, when the apparatus is operating in connected mode, the mapping in response to a received request from a base station subsystem for a measurement report comprising one or more of the closed subscriber group identity or one or more routing parameters.

38. An apparatus according to claim 37, wherein the at least one memory and stored computer program code are configured to, with the at least one processor, further cause the apparatus to use the retrieved mapping to format a measurement report for the closed subscriber group cell comprising one or more of the closed subscriber group identity or one or more routing parameters.

39. An apparatus according to claim 38, wherein the at least one memory and stored computer program code are configured to, with the at least one processor, also cause the apparatus to cause the measurement report to be transmitted to the base station subsystem so as to facilitate handover to the closed subscriber group cell.

40. An apparatus according to claim 21, wherein the apparatus of this embodiment may be modified as or may be embodied on a terminal.

* * * * *